United States Patent
Brown et al.

[15] 3,692,341
[45] Sept. 19, 1972

[54] BOLTED-UP FRICTION JOINTS IN STRUCTURAL STEEL-WORK

[72] Inventors: Kenneth G. Wynne Brown, Anchor House, Longcross Road, Chertsey; Keith Julyan Day, 19, Treemount Court, Grove Ave., Epsom, both of Surrey, England

[22] Filed: March 2, 1970

[21] Appl. No.: 15,789

[52] U.S. Cl. ...287/189.36 F, 287/126, 287/189.36 D
[51] Int. Cl.................................................F16b 5/00
[58] Field of Search....287/189.36 C, 189.36 D, 189.36 F, 287/112, 114, 52.06, 109, 126; 161/162; 285/238; 52/181; 151/37

[56] References Cited

UNITED STATES PATENTS

| | | | |
|---|---|---|---|
| 3,279,972 | 10/1966 | Thassy | 151/37 UX |
| 1,827,297 | 10/1931 | Moore | 287/109 UX |
| 3,325,195 | 6/1967 | Margis | 285/328 X |
| 3,468,753 | 9/1969 | Vincent et al. | 161/162 X |

OTHER PUBLICATIONS

Steel Construction Manual of the American Institute of Steel Construction, 5th Edition, 3rd Printing, dated U.S. Patent Office Library on Aug. 27, 1947; page 314 cited, Library Identification: TA– 684– A46– 1947.

*Primary Examiner*—David J. Williamowsky
*Assistant Examiner*—Wayne L. Shedd
*Attorney*—Woodhams, Blanchard & Flynn

[57] ABSTRACT

The mating faying surfaces in a structural steel-work joint are protected by a layer of corrosion-resisting material such as primer or galvanizing. This layer carries a further layer of a friction agent comprising a binder and friction-increasing particles such as grit or amorphous aluminum particles.

Both layers can be works-applied for greater reliability and consistency. The joint can be dismantled and reassembled without difficulty. The layer of corrosive-resisting material will be applied as an all-over protective layer for complete steel works components after cleaning off mill-scale.

12 Claims, 4 Drawing Figures

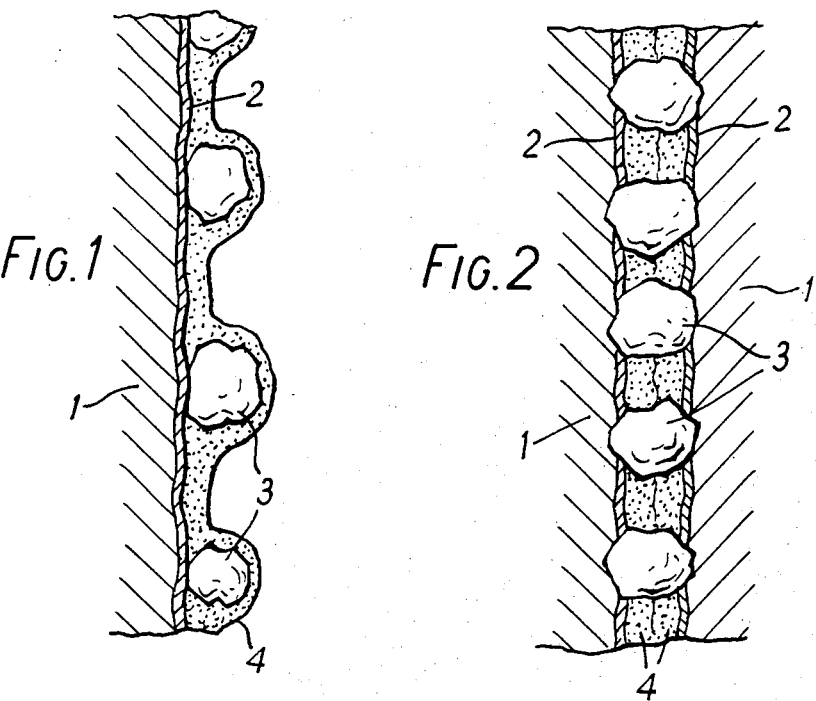
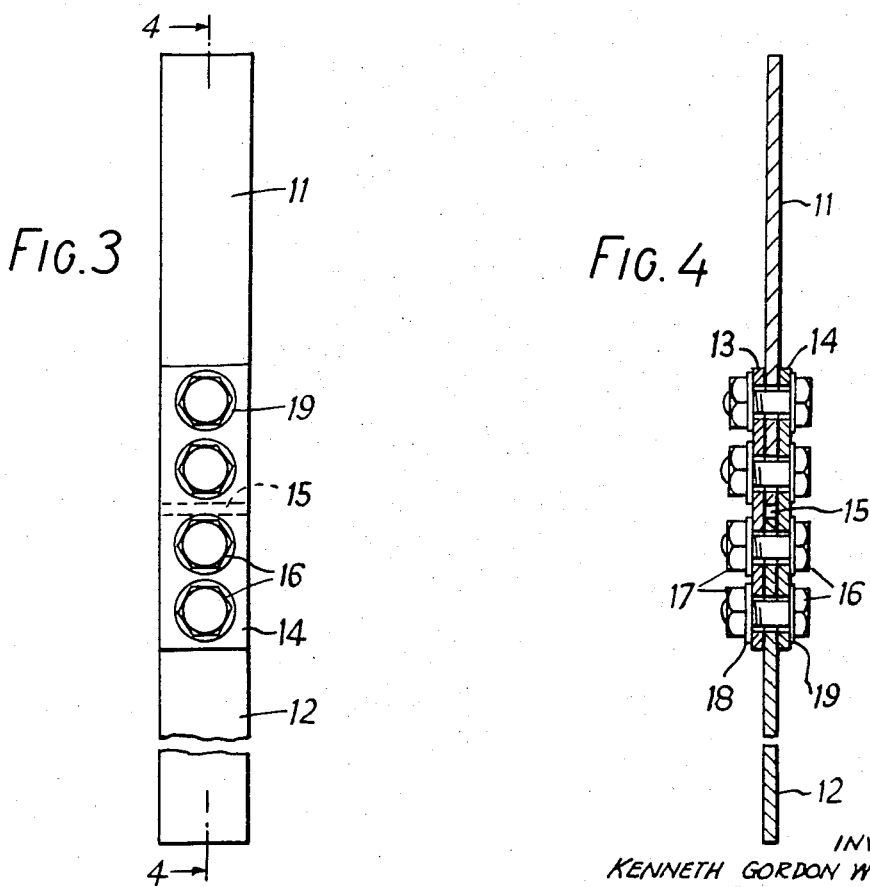

3,692,341

BOLTED-UP FRICTION JOINTS IN STRUCTURAL STEEL-WORK

BACKGROUND OF THE INVENTION

The present invention relates to bolted-up friction joints in structural steel-work.

In such joints, shearing forces between two members are transmitted by friction between faying surfaces of the two members, the two faying surfaces being tightly clamped together by high-strength friction-grip bolts.

An object of the present invention is to reduce the risk of slippage between faying surfaces in a bolted-up friction joint while at the same time protecting the faying surfaces against corrosion. In conventional practice, red lead is often applied to mating surfaces before a joint is bolted-up but such use of red lead so reduces the co-efficient of friction between faying surfaces that it cannot be used in bolted-up friction joints. The present British Standard Specification calls for no paint on faying surfaces but rusting in the joint might ensue, thereby reducing its load carrying capacity and running the risk of loosening the joint and/or the bolts and even of fracturing the bolts.

BRIEF DESCRIPTION OF THE INVENTION

In accordance with the present invention a faying surface of a structural steel-work member is cleaned free of mill scale and a layer of corrosion resisting material such as paint or hot-dip galvanizing is applied to it. Then a friction agent, in the form of a binder containing particles of friction-increasing particulate material is applied to the said layer and allowed to dry and cure after which the faying surface maybe bolted-up against the mating faying surface of another structural member with high-strength friction-grip bolts.

In one form of embodiment, the particulate material is in the form of particles of hard grit or gritlike material of size and shape such that when the joint is bolted-up, at least some of the particles will penetrate the corrosion-resisting layer on each surface and embed themselves into the underlying metal so as to key the two faying surfaces together against the possibility of slip.

In another form of embodiment, in particulate material is amorphous aluminum or aluminum alloy particles of such particle size distribution as to increase materially the shear strength of a film applied to each of the co-operating faying surfaces of the structural members which are ultimately secured together with the same high-strength friction-grip bolts.

With all forms of embodiment, the steel-work members may be grit blasted and primed, or galvanized, in order to provide a corrosion-resisting layer all over. The friction agent may then be applied to the faying surfaces and allowed to dry and cure, all these steps being conveniently carried out under the better controlled and supervised conditions in the factory or steelworks and away from the site. Thus no special preparation of the faying surfaces is required on site, thereby minimizing the amount of supervision required to ensure correct construction of the steel-work joints. Moreover, it is still possible after the steel-work has been erected on site to dismantle all or part of it, for example to permit the passage of some bulky object, without in any way affecting the properties of the faying surfaces or prejudicing their performance after reassembly, an operation impossible with site-applied epoxy resin adhesives directly bonding two steel-work members together.

In any of the forms of embodiment referred to above, the binder may be cold-curing synthetic resin.

In the first kind of embodiment the grit or gritlike substance may be an alumina-zirconia abrasive (80 percent aluminum oxide, 20 percent zirconium oxide) preferably within the size range of 50 to 120 F.E.P.A. (Federation of European Producers of Abrasives). A high proportion of metallic zinc dust may be included to give mechanical support to the grit and to provide further resistance to corrosion.

Grit of approximately size 60 F.E.P.A. has shown particularly promising results with grit-blasted steel profiles in the range of 0.002 to 0.004 in. peak-to-valley-height. Other examples of grit or gritlike materials which may be considered for appropriate cases are diamond particles, silicon carbide and tungsten carbide and hardened steel particles.

BRIEF DESCRIPTION OF THE DRAWINGS

In the accompanying drawings, which are given by way of example only,

FIG. 1 is a detail of a cross section through a faying surface of the invention, on an enlarged scale, FIG. 2 is a view similar to FIG. 1 but showing two faying surfaces tightly clamped together, FIG. 3 is an elevational view of a steel-work joint constructed as a test set, and FIG. 4 is a section of the test set of FIG. 3, on the line 4-4.

In FIGS. 1 and 2, the reference 1 denotes the steel of steel-work members. The steel 1 carries a layer 2 of corrosion-resisting material such as an etch primer which in turn carries a layer of friction agent comprising grit particles 3 embedded in a binder 4.

In an example of the first embodiment, a suitable composition for the friction agent has been found to be as follows:

| | |
|---|---|
| Metallic Zinc Powder | 75% (by weight) |
| Other Pigments | 1% |
| Aluminum Zirconium Oxide Grit | 4% |
| Solvents | 14% |
| Epoxy Resin | 6% |

Using such a composition, the following test results were obtained:

Slip Loads in Ions Force

| | With pre-fabrication Primer (Zinc-epoxy) | The same with a suitable addition of grit |
|---|---|---|
| A (Average of 3) | 28.7 | 35.0 |
| B (Average of 3) 28.1 | | 34.6 |
| C (Average of 3) | 27.1 | 34.1 |
| D (Average of 3) | 26.5 | 33.2 |
| Average: | 27.6 | 34.2 |
| Tension in bolts: 21 tons—approximately | | —21 tons |
| Average slip-factor | .329 | .407 |
| Improvement due to friction agent: | | About 24 % |

Slip-factor is calculated from the following formula:

Slip-factor $$= \frac{\text{Slip load}}{\text{No. of faces} \times \text{Tension in each bolt} \times \text{No. of bolts}}$$

∴ Average slip-factor $$= \frac{27.6}{2 \times 21 \times 2} = 0.329 \text{ and } \frac{34.2}{2 \times 21 \times 2} = 0.407$$

In examples of the second embodiment, suitable compositions have been found to be as follows:

2-Pack Polyurethane

Amorphous Aluminum Powder 70% (by weight) (grade 100–200 British Standard mesh)

| | |
|---|---|
| Polyester Resin | 7% |
| Isocyanate Hardener | 5% |
| Solvents | 18% |

1-Pack Polyurethane

| | |
|---|---|
| Amorphous Aluminum Powder | 70% (by weight) |
| Polyurethane Solution | 25% |
| Solvents | 2% |

In order to obtain the maximum co-efficient of friction in the joint, the proportion of aluminum should be as high as possible. However, to enable the composition to be applied like a paint, for example by brushing, it may be found that it is not possible to increase the proportion of aluminum much beyond the values given above.

Using such a composition the following test results were obtained using three 'sandwich' test sets of the kind shown in FIGS. 3 and 4, under tension.

The test set shown comprises two steel tension plates 11 and 12 which are connected together by two fish-plate members as straps 13 and 14. The adjacent edges of the tension plate 11 and 12 are separated by a gap 15. The straps 13 and 14 are tightly clamped against the tension plates 13 and 14 by high-strength bolts 16 and nuts 17 with washers 18 and 19 beneath the nuts 17 and the heads of the bolts 16. A clearance is left between the bolts 16 and their holes in the plates 11 and 12 and straps 13 and 14. The faying surfaces of both the tension plates 11 and 12 and of the straps 13 and 14 are treated as described above. The readings X, Y indicate the tensions at which the first and second joints slip yielded.

| | With Pre-fabrication Primer (Zinc/Epoxy) | The same, with further Application of Aluminum Epoxy Friction Agent. |
|---|---|---|
| 1X | 25.2 | 34.5 |
| 1Y | 25.2 | 34.5 |
| 2X | 26.0 | 32.6 |
| 2Y | 28.8 | 32.6 |
| 3X | 24.8 | 33.2 |
| 3Y | 27.7 | 31.0 |
| Average: | 26.28 | 33.07 |
| Tension in bolts: | 21 tons | 21 tons approximately |
| Average slip factor: | .312 | .394 |
| Improvement due to friction Agent: | | about 25% |

Further tests were carried out by applying a torque between test pieces forced together by a compressive load. In order to compare the torque tests with the straight-pull slip tests, the following comparison tests were made using a similar composition but without the grit. The following results were obtained with a compressive load of 16 tons for both tests.

| | By Torque Testing Torque Load in Tons at 14" radius | By Slip Testing, Slip Factor |
|---|---|---|
| Set A | .250 (average of 2) | .370 |
| Set B | .255 | .390 |
| Set C | .2505 | .380 |
| Then | .2518 tons of torque load is equivalent | to .380 slip factor. | or 0.1 ton of torque is equivalent to approximately .15 slip factor.

Using the same composition but with 60 F.E.P.A. grit added and maintaining a compressive load of 16 tons for all tests, the following results were obtained and the slip factors calculated:

| | Torque in tons | Equivalent slip factor |
|---|---|---|
| Set No. 53 | .378 | .565 |
| | .365 | .545 |
| | .340 | .510 |

Giving an average slip factor of .540.
Improvement due to friction agent: 42.2%.
With galvanizing, the following results were given:

| | Treatment | Average torque load in tons |
|---|---|---|
| Set No. G1 | Nil | .160 |
| Set No. G3 | FEPA 60 Friction Agent. | .186 |
| Set No. G5 | FEPA 100 Friction Agent. | .240 |

Improvement in friction of G5 over G1: 50%

Using 16 tons compressive load and testing by the torque method the following results were obtained:

| | Treatment over primed grit-blasted steel: | Torque load in tons | Equivalent slip Factor |
|---|---|---|---|
| Set 17 | 2 pack polyurethane as above | .368 | .555 |
| 40 | 2 pack polyurethane as above | .392 | .589 |
| 63 | 2 pack polyurethane as above | .364 | .542 |
| 19 | 1 pack polyurethane as above | .400 | .600 |
| 42 | 1 pack polyurethane as above | .416 | .625 |
| 65 | 1 pack polyurethane as above | .427 | .642 |
| Sets A, B & C Primer alone (average of 3) | | .2518 | .380 |

Average improvement due to the friction agents:

| | |
|---|---|
| With 2 pack Polyurethane | 48% |
| With 1 pack Polyurethane | 63.7% |

We claim:
1. In a bolted-up friction joint in structural steelwork, a rigid structural steel-work member having a substantially flat faying surface which is cleaned of mill scale, said faying surface having at least one bolt hole therethrough, and a high strength bolt extending through said bolt hole clamping said faying surface tightly against a further similar faying surface of a further rigid structural steel-work member, comprising the improvement wherein friction-increasing composition means is applied to said faying surface for increasing the frictional characteristics thereof, said friction-increasing composition means being applied to said faying surface in surrounding relation to said bolt hole, said friction-increasing composition means including a hardenable synthetic binder material forming a solid surface layer on said faying surface, said composition means also including friction-increasing material in particulate form in said binder material, said friction-increasing material comprising hard grit-like particles capable of embedding themselves in the metal of the steel-work member, the layer of friction-increasing composition means on said faying surface being positioned to overlie said further faying surface, said grit-like particles being of a size and shape relative to the thickness of said layer of friction-increasing composition means such that when said faying surface is tightly compressed against said further faying surface of said further structural steel-work member at least some of said particles penetrate both faying surfaces and embed themselves in the metal of the structural steel-work members, the periphery of the region disposed between the faying surfaces in which is disposed said layer of friction-increasing composition means being open.

2. The combination according to claim 1, in which said grit-like particles is an abrasive within the size range of 50 to 120 F.E.P.A.

3. The combination according to claim 1, in which said grit-like particles is an alumina-zirconia abrasive.

4. The combination according to claim 1, in which said surface layer also includes metallic zinc powder.

5. The combination according to claim 1, in which said particulate material is aluminum alloy particles.

6. The combination according to claim 5, in which said aluminum alloy particles are substantially in the range of 100–200 British Standard mesh.

7. The combination according to claim 1 wherein the said binder is a cold setting resin.

8. The combination according to claim 7, in which said resin is an epoxy resin.

9. The combination according to claim 7, in which said resin is a polyurethane.

10. The combination according to claim 9, in which said resin is a one-pack polyurethane binder.

11. The combination member according to claim 1, in which the faying surface is hot-dip galvanized prior to said composition means being applied thereto.

12. In a bolted-up friction joint in structural steel-work including first and second structural steel-work members each having a substantially flat faying surface which is cleaned of mill scale and carries a layer of corrosion-resisting material, said faying surfaces being disposed so as to face one another, each said faying surface having at least one bolt hole therethrough, and a high strength bolt extending through said bolt hole clamping said first and second structural steel-work members tightly together with said faying surfaces being disposed closely adjacent and directly opposite one another, comprising the improvement wherein friction-increasing composition means is applied to each said faying surface for increasing the frictional characteristics thereof, said friction-increasing composition means including a binder material selected from the group consisting of epoxy resins and polyurethane resins, the binder material forming a solid surface layer on said corrosion-resisting layer, said composition means also including friction-increasing material in particulate form in said binder material, said friction-increasing material consisting of grit particles having a high shear strength and hardness relative to said faying surfaces the layers of friction-increasing composition means on said faying surfaces being disposed in overlying engagement with one another when said first and second steel-work members are fixedly interconnected by said bolt, said grit particles being of a size and shape relative to the thickness of said layers of friction-increasing composition means such that when said faying surfaces are tightly compressed against one another at least some of said particles penetrate both layers of corrosion resisting material and embed themselves into the underlying metal, the periphery of the region disposed between the faying surfaces in which is disposed said overlying layers of friction-increasing composition means being open.

* * * * *